United States Patent [19]

Christ

[11] Patent Number: 4,647,295
[45] Date of Patent: Mar. 3, 1987

[54] WORKTOP AIR CLEANER

[76] Inventor: Clifford W. Christ, 31 Croft La., Smithtown, N.Y. 11787

[21] Appl. No.: 856,480

[22] Filed: Apr. 28, 1986

[51] Int. Cl.⁴ ............................................. B01D 46/00
[52] U.S. Cl. ................................. 55/97; 55/DIG. 18; 55/DIG. 29; 55/473; 55/482; 55/357; 15/301; 132/73; 98/115.1
[58] Field of Search ................ 55/DIG. 18, DIG. 29, 55/473, 97, 482, 357; 98/115.1, 115.3, 115.4; 132/45 R, 73; 15/300, 301, 310

[56] References Cited

U.S. PATENT DOCUMENTS

| | | | |
|---|---|---|---|
| 2,347,334 | 4/1944 | Schmieg | 55/DIG. 18 |
| 3,936,284 | 2/1976 | Mason | 55/472 |
| 4,604,111 | 8/1986 | Natale | 55/97 |
| 4,613,348 | 9/1986 | Natale | 55/467 |

*Primary Examiner*—Bernard Nozick
*Attorney, Agent, or Firm*—Leonard Belkin

[57] ABSTRACT

Apparatus and method for removing obnoxious fumes and particulate laden air from a work area above a table or desk for the treatment of human nails. The removed air is filtered in a unit removed from the table or desk to remove particulate 3 microns and larger in size and the fume laden air is diffused into the environment at a location remote from the work area and in a concentration sufficiently low to avoid discomfort to those present in the area.

5 Claims, 3 Drawing Figures

WORKTOP AIR CLEANER

BACKGROUND OF THE INVENTION

This invention relates to a work top air cleaner and more particularly to a work top air cleaner for use in the removal of obnoxious fumes and dust generated during the nail treatment of a customer.

The treatment of human nails for esthetic purposes generally involves the application of a liquid acrylic which sets to produce a nail-like member or a wrap which may be a suitable material such as silk, fiber glass, linen or the like coated with an acrylic or other material designed to set and produce a nail-like member. Regardless of the technique involved, however, the roughly formed nail must be filed or ground down to the shape desired and one or more coats of nail polish must be applied to complete the nail in a form which is esthetically pleasing to the customer.

The acrylic and other liquids employed give off distasteful or obnoxious fumes and the trimming of the nails, accomplished by cutters and files, emits dust particles which are similarly objectionable, and in fact, could be harmful to the technician who is exposed to such materials over extended periods.

It is current practice to permit the obnoxious fumes and particulate laden air to disperse without any positive effort to remove them, while the dust collecting in the work area is occasionally swept away with a brush and a dust pan.

Other efforts have been made to remove these materials on an ongoing basis but they have been unsuccessful largely due to compromises designed to minimize noise disturbance, cost, and other disadvantages associated with such attempts.

A variety of air removal systems in other types of operations are shown in some U.S. patents.

U.S. Pat. No. 3,828,530 shows an air removal system for use in a so-called clean room. U.S. Pat. No. 4,087,925 shows a clean air arrangement for a hair dryer involving a filter. U.S. Pat. No. 4,109,144 discloses a unit which removes dust using an overhead collector. U.S. Pat. No. 4,221,081 shows a unit for use with a grinder. U.S. Pat. No. 4,226,054 teaches a dust pickup which uses interchangeable nozzles.

None of the aforementioned arrangements are suitable for use in nail treatment areas, either because they are too noisy, tend to interfere with the procedures involved, or lack the effectiveness within a limited area which is required for the unique circumstances surrounding nail treatment procedures.

SUMMARY OF THE INVENTION

The present invention has to do with effective, efficient and unobtrusive apparatus and method for maintaining a safe and comfortable work area where nail treatment procedures are being followed.

In the present invention, obnoxious fumes and dust particles are removed from such a work area by withdrawing the air containing them through an opening in a table or desk top over which the treatment is being carried out. A high rate of air flow is maintained in a very limited work area in order for the fumes and particles to be removed effectively to avoid buildup or accumulation in the area and without inconvenience to the technician and customer, accomplishing this unobtrusively, with a minimum of distracting noise.

In accordance with a preferred embodiment of this invention there is provided apparatus for the removal of obnoxious fumes and dust particles produced by human nail treatment from a work area located above the top surface of a table or desk through an opening in the top surface. A unit removed from the table or desk is connected by a hose to receive the fumes and dust laden air. The container is divided into two compartments formed by a divider on which is mounted within the first compartment a motor driven blower with its outlet connected to an opening through the divider into the second compartment. An outside wall of the container communicating with the second compartment is provided with spaced openings over its whole surface and a two stage filter within the container covering all the openings so that the particulate is trapped within the filter. The fume laden air is returned to the environment by way of openings which diffuse the air over the whole area of the wall of the container. The air blower carries at least 150 cfm of air through the table or desk opening which is no larger than about 3 in. or the width of an average adult hand to insure adequate air velocity for the removal of the undesirable fumes and particulate.

In another embodiment of this invention there is provided a method of removing obnoxious fumes and dust laden air from a work area for human nail treatment comprising the steps of withdrawing such air at a rate sufficient to prevent buildup or accumulation in the work area down through an opening in the top surface of a table or desk defining the work area, said opening having a maximum dimension no larger than about 3 in. or the width of an average adult human hand, removing the particulate from said air in a container removed from said table or desk, and diffusing the fume laden air into the environment at a relatively low rate of air movement.

It is thus a principal object and advantage of this invention to provide apparatus for the removal of obnoxious fumes and particle laden air from a human nail treatment work area.

Another object is a method for the removal of obnoxious fumes and particle laden air from a human nail treatment work area.

Other objects and advantages of this invention will become obvious from the following description of preferred embodiments of this invention.

DETAILED DESCRIPTION OF THE PREFERRED EMBODIMENT

Figure 1:
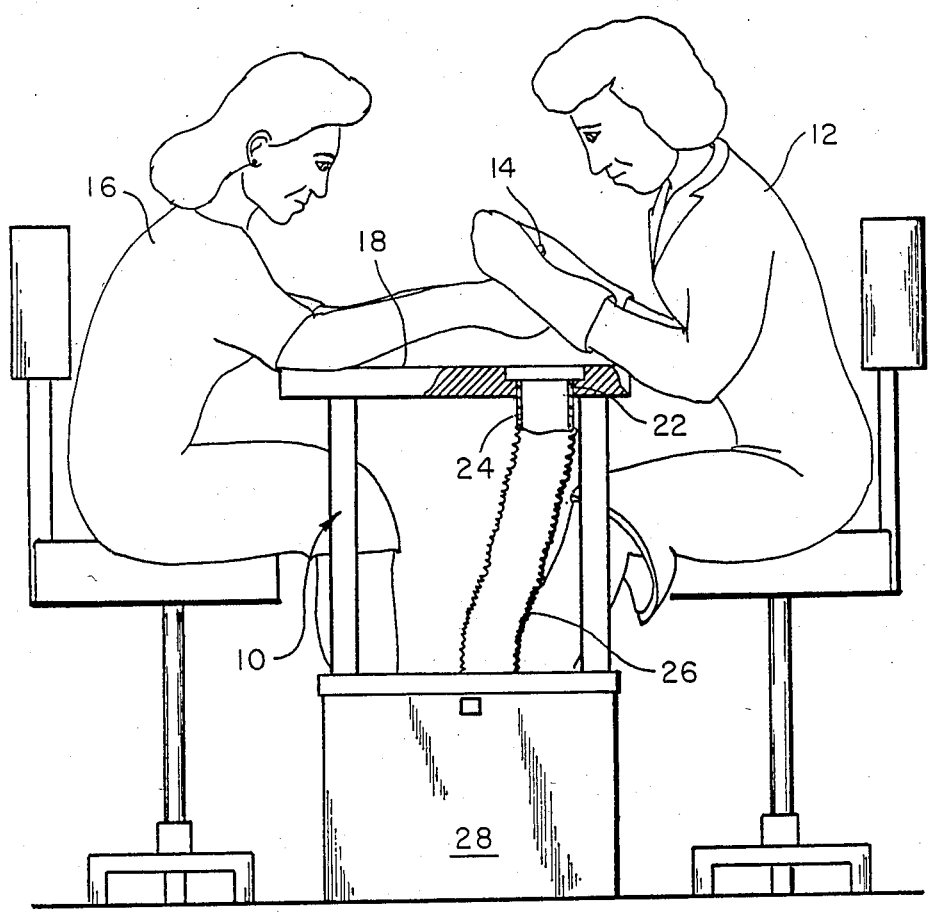
FIG. 1 is an illustration of a typical work area with a portion of the top surface of the table cut away.

Referring to FIG. 1, there is illustrated a table or desk 10 with a technician 12 seated and working on the nails 14 of a customer 16 who is seated across from technician 12. The hands of both parties are extended across counter top 18 of table 10. Through top 18 is a countersunk circular opening 22 to accommodate a transition member 24 extending below counter top 18 to permit one end of a hose 26 to be connected.

Figure 2:
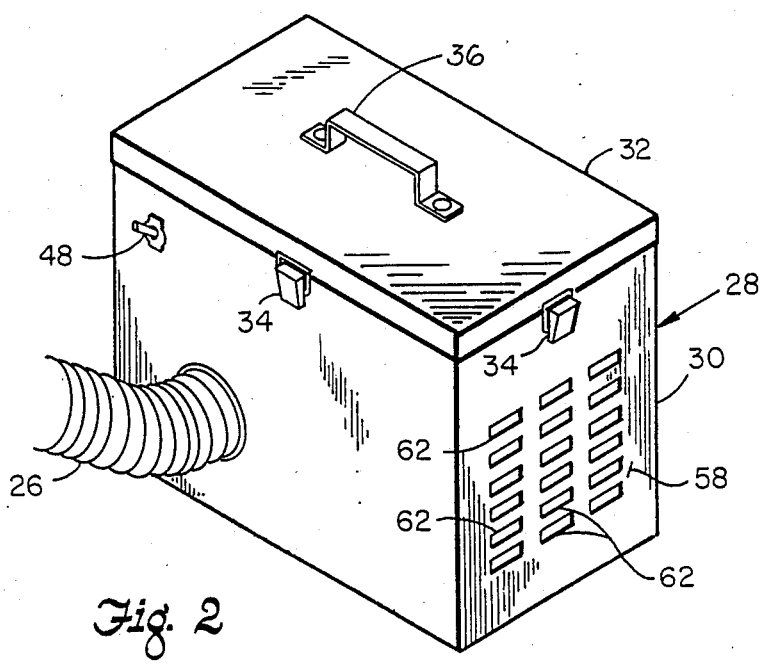
FIG. 2 is an isometric view of the filter unit.
Figure 3:
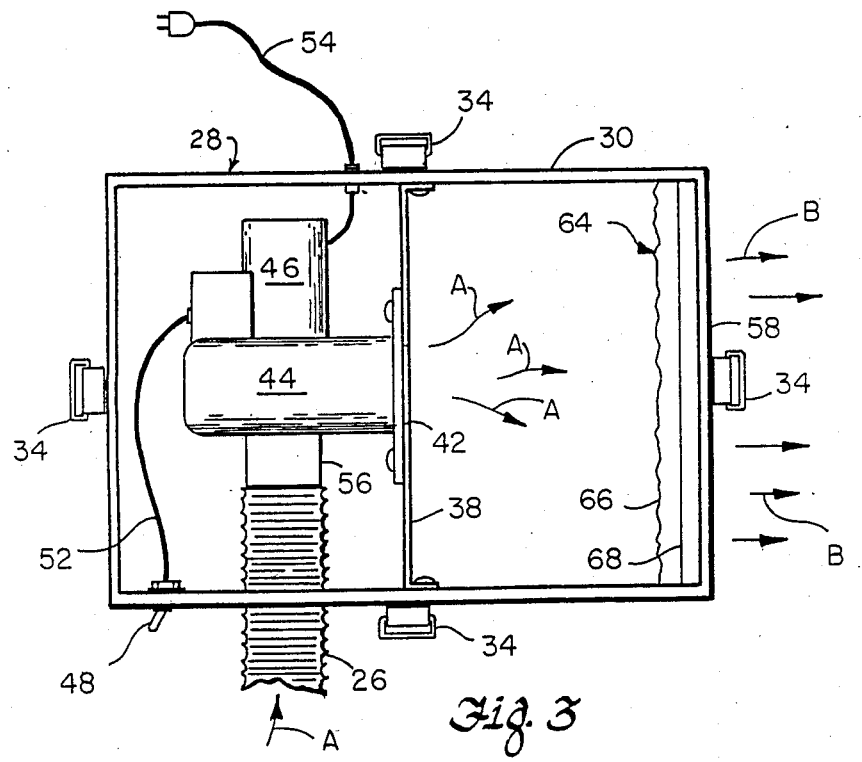
FIG. 3 is a view looking into filter unit with its cover removed.

Resting on the floor near table 10 is filter unit 28. As best seen in FIGS. 2 and 3, unit 28 consists of a generally rectangular housing 30 with a removable cover 32 held in place by four clasps 34 and a handle 36 to facilitate removal of cover 32 when unclasped and to carry unit 28 when attached in place as seen in FIG. 2.

The space within housing 30 is divided into two compartments by a plate 38 completely isolating the spaces on its opposite sides except for opening 42 through plate 38. Mounted on one side of plate 38 in the first compartment is a squirrel cage blower 44 with its discharge through opening 42. Blower 44 is driven by an electric motor 46 with an on-off toggle switch 48 on the outside of housing 30 connected by electric wire 52 to motor 46. A line cord 54 supplies electric power to motor 46.

Intake to blower 44 is by way of hose 26 through a transition member 56 mounted on the intake or suction side of the blower. When motor 46 is energized, air flow as indicated by arrows A is from hose 26 through blower 44 and opening 42 into the second compartment thereby pressurizing the latter.

Wall 58 of housing 30 is substantially completely covered by spaced openings 62 as best seen in FIG. 2. The size, number and area covered by openings 62 are sufficient to insure that the air returned to the environment will diffuse into the surrounding air with a minimum flow velocity and concentration at no significant risk or discomfort to those present.

Within the second compartment of housing 30 as best seen in FIG. 3, a two stage filter 64 is mounted against wall 58 so that all air leaving unit 28 by way of openings 62 as shown by arrows B will be filtered for the removal of particulate. Filter 64 has a first stage 66 to remove coarser particles and a second stage 68 to remove finer particles. Filter 64 is tackified, that is, it is coated with a tacky substance to trap particulate and is capable of removing particles 3 microns in size and larger.

In the treatment of human nails, as previously has been noted, there is generated in the work area some obnoxious fumes from the acrylic materials and other nail treatment chemical agents and particulate from the trimming of the nails including fine particulate from the filing down of the nails to the desired shape. These obnoxious materials are concentrated in a very small space in the work area although the total amounts, especially the fumes, are quite small and would not be bothersome if present over a wider area. The particulate, some of which is present in the form of a fine dust, would without effective removal collect on the hands and clothing of the technician and customer as well as on the table and any objects present in the vicinity.

In order to remove effectively these products from the work area and avoid the problems noted above, it is necessary to establish a rapid air flow in a very small region.

In this invention that is accomplished by employing opening 22 in the table top which is quite small, no larger in diameter, if cirular in shape, than a typical or average width of the hand of an adult, defined herein, as about 3 inches. If noncircular in shape that limitation of size would apply to its largest dimension across the opening. In addition, blower capacity would be sufficient to carry the soiled air into opening 22 at the rate of at least 150 cfm. In other words, the velocity of the air entering opening 22 is established by the volumetric rate of flow and opening size indicated above in order to prevent any accumulation of obnoxious fumes and settling of particulate in the work area.

In the operation of the apparatus described, the technician would at the beginning of the nail treatment actuate the apparatus by flipping toggle switch 48 to energize motor 46. The obnoxious fumes and particulate laden air would be drawn into opening 22 and through unit 28, returning the air to the environment with only the obnoxious fumes present after the removal of the particulate down to about 3 microns. As previously noted, the amount of fumes present is quite small and its return to the environment away from the work area diffused over a wider area than the work area itself will cause sufficient dispersion so as not to cause any discomfort to any of those present in the vicinity, presuming that the room in which the treatment is conducted has a minimum adequate ventilation.

While only a preferred embodiment of this invention has been described it is understood that many changes and variations thereof are possible without departing from the principles of this invention as defined in the claims which follow.

What is claimed is:

1. The method of removing obnoxious fumes and particles produced by human nail treatment in a work area located above the top surface of a table or desk comprising the steps of establishing a flow of air in a unit removed from said table or desk, establishing a suction in said work area and flow of obnoxious fume and particulate laden air from said work area at a flow rate of at least 150 cfm down through an opening in said table or desk to said unit, filtering said air for removing particulate of 3 microns and greater in size, and returning the obnoxious fume laden air to the environment by way of openings in said unit of sufficient number, size and total area as to reduce concentration of said fumes down to a level which does not entail a significant risk of discomfort, and in a region remote or removed from said work area.

2. The method of claim 1 in which said opening is no larger than about the width of an average adult human hand.

3. Apparatus for the removal of obnoxious fumes and dust particles produced by human nail treatment from a work area located above the top surface of a table or desk comprising a single opening formed in said surface whose longest dimension is no larger than about the width of a human hand, container means removed from said table or desk, said container means having a removable cover and an interior divided into a pair of separate compartments by a divider wall, blower means within said first compartment mounted on said divider wall having an intake within said first compartment and its outlet communicating with an opening through said divider wall into the second compartment, motor means within said first compartment for driving said air blower means, a plurality of spaced openings filling substantially an outer wall of said container means communicating with said second compartment, particulate trapping filter means within said second compartment in contact with said outer wall covering all of said spaced openings, said filter means comprising a filter designed to trap three microns and larger size particles, and means for carrying fumes and dust laden air from said opening drawn through said top surface into said first compartment and the intake of said blower, said filter means trapping particulate within said fume and dust laden air and diffusing the fume laden air to the environment through said openings at a location remote from said work area, said blower having sufficient capacity to establish a velocity of fume and particulate laden air into said opening sufficient to carry away said air without buildup of fumes and settling of particulate in the work area.

4. The apparatus of claim 3 in which the size, number and area covered by the spaced openings are sufficient to insure that the obnoxious fumes being returned to the ambient state are sufficiently dispersed so as not to entail any significant risk of discomfort to anyone present in the vicinity.

5. The apparatus of claim 4 in which the capacity of said blower means is sufficient to establish a flow rate of said fumes and dust laden air is at least 150 cfm.

* * * * *